(12) United States Patent
van Egmond

(10) Patent No.: US 11,591,458 B2
(45) Date of Patent: Feb. 28, 2023

(54) POLYOLEFINS WITH LOW ASH CONTENT AND METHOD OF MAKING SAME

(71) Applicant: W.R. Grace & Co.-Conn., Columbia, MD (US)

(72) Inventor: Jan Willem van Egmond, Charleston, WV (US)

(73) Assignee: W.R. GRACE & CO.-CONN., Columbia, MD (US)

( * ) Notice: Subject to any disclaimer, the term of this patent is extended or adjusted under 35 U.S.C. 154(b) by 958 days.

(21) Appl. No.: 16/329,586

(22) PCT Filed: Aug. 30, 2017

(86) PCT No.: PCT/US2017/049377
§ 371 (c)(1),
(2) Date: Feb. 28, 2019

(87) PCT Pub. No.: WO2018/045030
PCT Pub. Date: Mar. 8, 2018

(65) Prior Publication Data
US 2019/0300744 A1    Oct. 3, 2019

Related U.S. Application Data

(60) Provisional application No. 62/381,070, filed on Aug. 30, 2016.

(51) Int. Cl.
| | | |
|---|---|---|
| *C08F 110/06* | (2006.01) | |
| *H01G 2/10* | (2006.01) | |
| *C08L 23/12* | (2006.01) | |
| *C09D 123/12* | (2006.01) | |
| *C08F 10/06* | (2006.01) | |
| *C08L 23/16* | (2006.01) | |
| *C08L 67/00* | (2006.01) | |

(52) U.S. Cl.
CPC .............. *C08L 23/12* (2013.01); *C08F 10/06* (2013.01); *C08F 110/06* (2013.01); *C08L 23/16* (2013.01); *C08L 67/00* (2013.01); *C09D 123/12* (2013.01); *H01G 2/10* (2013.01); *C08F 2410/01* (2013.01); *C08L 2205/025* (2013.01)

(58) Field of Classification Search
CPC ....... C08F 10/06; C08F 110/06; C08F 210/06
See application file for complete search history.

(56) References Cited

U.S. PATENT DOCUMENTS

| 4,622,358 A | 11/1986 | Pennewiss et al. | |
|---|---|---|---|
| 4,657,883 A | 4/1987 | Arzoumanidis et al. | |
| 5,432,244 A * | 7/1995 | Rebhan | C08F 10/00 526/125.4 |
| 5,573,840 A * | 11/1996 | Inoue | C08L 23/12 524/269 |
| 6,153,549 A | 11/2000 | Hubscher et al. | |
| 7,491,670 B2 | 2/2009 | Chen et al. | |
| 8,916,644 B2 * | 12/2014 | Tamura | B01D 67/003 429/251 |
| 9,181,423 B2 * | 11/2015 | Kock | C08L 23/06 |
| 10,221,261 B2 * | 3/2019 | Galvan | C08F 10/06 |
| 2009/0203863 A1 | 8/2009 | Chen | |
| 2009/0312507 A1 * | 12/2009 | Standaert | C08F 10/00 526/125.8 |
| 2010/0324225 A1 | 12/2010 | Zummallen | |
| 2011/0034649 A1 * | 2/2011 | Standaert | C08F 10/06 526/124.3 |
| 2011/0130530 A1 | 6/2011 | Coalter et al. | |
| 2013/0109789 A1 | 5/2013 | Hamaki et al. | |
| 2014/0142241 A1 * | 5/2014 | Chou | C08F 10/06 526/213 |
| 2016/0244538 A1 | 8/2016 | Liu et al. | |

FOREIGN PATENT DOCUMENTS

| CN | 1856514 A | 11/2006 |
|---|---|---|
| CN | 101421318 A | 4/2009 |
| CN | 103044593 A | 4/2013 |
| CN | 103382234 A | 11/2013 |
| CN | 103403038 A | 11/2013 |
| CN | 105121483 A | 12/2015 |
| EA | 201000766 A1 | 12/2010 |
| EP | 1 586 589 A1 | 10/2005 |
| EP | 2 902 418 A1 | 8/2015 |
| GB | 0 568 102 A | 3/1945 |
| JP | H06-236709 A | 8/1994 |
| JP | 2008-133351 A | 6/2008 |

(Continued)

OTHER PUBLICATIONS

Russian Intellectual Property Office, Official Action issued in corresponding RU Application No. 2019109042/04(017384), dated Sep. 30, 2020, 4 pages, English translation.
European Patent Office, Extended Search Report and Written Opinion in EP Application No. EP 17847466.4, dated May 7, 2020, 9 Pages.
International Searching Authority, International Search Report and Written Opinion in International Application No. PCT/US2017/049377, dated Mar. 5, 2019, 7 Pages.
Decision of Refusal on JP Application No. 2019-531592 dated Mar. 7, 2022 (English translation included, 14 pages).
Decision to Grant on RU Application No. 2019109042 dated Feb. 15, 2022 (English translation included, 15 pages).

(Continued)

*Primary Examiner* — Rip A Lee
(74) *Attorney, Agent, or Firm* — Foley & Lardner LLP

(57) ABSTRACT

A polymerization process includes contacting an olefin or a mixture of the olefin and one or more copolymerizable comonomers under polymerization conditions with a catalyst composition and forming a polymer with a total ash content of less than 15 ppm. The catalyst composition includes one or more polymerization catalysts; and a mixed external electron donor comprising a selectivity control agent comprising at least one silicon-containing compound containing at least one C1-C10 alkoxy group bonded to a silicon atom.

16 Claims, No Drawings

(56) References Cited

FOREIGN PATENT DOCUMENTS

| | | | | |
|---|---|---|---|---|
| JP | 2014-525969 A | 10/2014 | | |
| JP | 2016-514759 A | 5/2016 | | |
| KR | 10-2004-0091007 | 10/2004 | | |
| KR | 10-2010-0061502 A | 6/2010 | | |
| KR | 10-2014-0043801 A | 4/2014 | | |
| KR | 10-2016-0065181 A | 6/2016 | | |
| RU | 2497834 C2 | 11/2013 | | |
| WO | WO-2005/030815 A1 | 4/2005 | | |
| WO | 2007122240 A1 | 11/2007 | | |
| WO | WO-2009/077467 A1 | 6/2009 | | |
| WO | WO-2012/087535 A1 | 6/2012 | | |
| WO | 2013041470 A1 | 3/2013 | | |
| WO | WO 2013/041470 A1 * | 3/2013 | ............. | C08F 4/651 |
| WO | 2013127707 A1 | 9/2013 | | |
| WO | WO 2013/127707 A1 * | 9/2013 | ............. | C08F 10/06 |
| WO | WO-2014/023603 A1 | 2/2014 | | |
| WO | 2014166779 A1 | 10/2014 | | |
| WO | WO 2014/166779 A1 * | 10/2014 | ............ | C08F 110/06 |
| WO | WO-2015/043526 A1 | 4/2015 | | |
| WO | WO-2015/075054 A1 | 5/2015 | | |
| WO | WO-2015/081254 A1 | 6/2015 | | |
| WO | WO-2016/066446 A1 | 5/2016 | | |

OTHER PUBLICATIONS

Di Noto, et al., High Yield MgCL2-supported catalysts for propene polymerization: effects of ethyl propionate as internal donor on the activity and sterospecificity, Macromol. Chem. Phys. 199, 633-640 (1998).

Examination Report on IN Application No. 201917007473 dated Jan. 27, 2021 (English translation included, 10 pages).

Examination Report on IN Application No. 201917007848 dated Jan. 22, 2021 (English translation included, 6 pages).

Extended European Search Report on EP Application No. 17847458.1 dated Jun. 8, 2020 (16 pages).

First Office Action on CN Application No. 201780064763.4 dated May 14, 2021 (English translation included, 28 pages).

First Office Action on CN Application No. 201780065194.5 dated Oct. 28, 2020 (English translation included, 12 pages).

First Office Action on CO Application No. NC2019/0001885 dated Aug. 21, 2020 (English translation included, 16 pages).

First Office Action on SA Application No. 519401212 dated Mar. 23, 2022 (English translation included, 13 pages).

First Office Action on VN Application No. 1-2019-01033 dated Mar. 29, 2022 (English translation included, 3 pages).

First Written Opinion on SG Application No. 11201901662U dated Mar. 3, 2020 (9 pages).

Hong, Dingyi, Editor, Polypropylene-Mechanism, Process and Technology, published Sep. 1, 2002, ISBN 7-80164-258-9 (Partial English translation included, 11 pages).

International Preliminary Report on Patentability in International Application No. PCT/US2017/049357, dated Mar. 5, 2019, 10 pages.

International Search Report and Written Opinion on International Application No. PCT/US2017/049377 dated Nov. 3, 2017 (8 pages).

International Search Report and Written Opinion on International Application No. PCT/US2017/049357 dated Nov. 3, 2017 (11 pages).

Notice of Reasons for Refusal on JP Application No. 2019-531590 dated May 17, 2021 (English translation included, 8 pages).

Notice of Reasons for Refusal on JP Application No. 2019-531592 dated Apr. 19, 2021 (English translation included, 12 pages).

Notification of Reason for Refusal on KR Application No. 10-2019-7007835 dated Feb. 2, 2022 (English translation included, 15 pages).

Notification of Reason for Refusal on KR Application No. 10-2019-7007836 dated Feb. 2, 2022 (English translation included, 14 pages).

Office Action and Search Report on RU Application No. 2019109042 dated Dec. 9, 2020 (English translation included, 18 pages).

Office Action and Search Report on RU Application No. 2019109043 dated Apr. 30, 2021 (English translation included, 21 pages).

Office Action on ID Application No. PID201901794 dated Feb. 25, 2021 (English translation included, 4 pages).

Office Action on ID Application No. PID201901802 dated Mar. 4, 2021 (English translation included, 4 pages).

Office Action on RU Application No. 2019109042 dated Jun. 28, 2021 (English translation included, 14 pages).

Office Action on RU Application No. 2019109043 dated Jan. 18, 2022 (English translation included, 17 pages).

Office Action on SA Application No. 519401213 dated Nov. 28, 2021 (English translation included, 11 pages).

Partial Supplementary European Search Report on EP Application No. 17847458.1 dated Mar. 27, 2020 (15 pages).

Preliminary Office Action and Search Report on BR Application No. 112019003864-7 dated Aug. 31, 2021 (English translation included, 9 pages).

Second Office Action on CN Application No. 201780065194.5 dated Aug. 20, 2021 (English translation included, 21 pages).

Second Office Action on CO Application No. NC2019/0001885 dated Feb. 26, 2021 (English translation included, 15 pages).

Second Written Opinion on SG Application No. 11201901662U dated Sep. 1, 2020 (8 pages).

Third Office Action on CO Application No. NC2019/0001885 dated Feb. 18, 2022 (English translation included, 18 pages).

Third Written Opinion on SG Application No. 11201901662U dated Jan. 5, 2022 (7 pages).

Foreign Action other than Search Report on KR 2019-7007835 dated Sep. 30, 2022.

Foreign Action other than Search Report on KR 2019-7007836 dated Oct. 2, 2022.

\* cited by examiner

POLYOLEFINS WITH LOW ASH CONTENT AND METHOD OF MAKING SAME

CROSS-REFERENCE TO RELATED APPLICATIONS

This application is a submission under 35 U.S.C. § 371 of International Application No. PCT/US2017/049377, filed Aug. 30, 2017, which claims priority to U.S. Application No. 62/381,070, filed Aug. 30, 2016, the disclosures of which are hereby expressly incorporated by reference herein in their entireties.

FIELD

The present invention is generally related to the field of polyolefin synthesis, and more particularly, polyolefins with low ash content and polymerization methods.

BACKGROUND

Commercially, polyolefins are synthesized using Ziegler-Natta polymerization catalyst systems. These systems typically include a chemical species with a transition metal component and halide components, along with an optional internal electron donor. Additionally, these systems may include a co-catalyst, one or more selectivity control agents (SCA), and optionally one or more activity limiting agents (ALA). Certain SCA and ALA, as well as their functionality in polymerization systems, were described in U.S. Pat. No. 7,491,670, the contents of which is incorporated herein by reference.

After polymerization, conventional polyolefins are typically washed prior to application in order to remove catalyst residue and lower total ash content, which results in high-purity polyolefins. "Ash" denotes the residue of aluminum, catalyst, cocatalyst, or any additive, such as titanium (Ti) and magnesium (Mg) used in the production of polyolefin polymers. Washing polyolefins, however, is expensive, time consuming, and requires additional processing resources.

High purity polyolefins are highly desired for a number of applications. For example, high-purity polypropylene, which is extremely reduced in impurities caused by a catalyst, may be made into a film as thin as 5 μm or less and is applied to a high-performance condenser. Additionally, high-purity polypropylene may be suitable for uses as original roll sheets for a capacitor film or as raw resins for a capacitor film.

Therefore, a need exists for a polymerization method and resulting polymer with low total ash content. Further desired is a polymer with a low total ash content that does not require a wash procedure yet still exhibits acceptably low catalyst residual.

SUMMARY

In an attempt to overcome the noted deficiencies, aspects of the present invention are directed toward low ash polyolefins and methods of making same.

The present invention is premised on the realization that a polymer with lower residue and ash contents is obtainable by increasing catalyst lifetime without significantly decreasing catalyst productivity. A first embodiment of the invention is directed to a low ash polyolefin. The same or a different embodiment is directed to a polymerization process. The process includes polymerization process includes contacting an olefin or a mixture of the olefin and one or more copolymerizable comonomers under polymerization conditions with a catalyst composition and forming a polymer with a total ash content of less than 15 ppm. The catalyst composition includes one or more polymerization catalysts; and a mixed external electron donor comprising a selectivity control agent comprising at least one silicon-containing compound containing at least one C1-C10 alkoxy group bonded to a silicon atom. The catalyst composition may have a relatively low aluminum to transition metal ratio. The catalyst composition may include one or more agent compounds of C2-C13 mono- or polycarboxylic esters of aliphatic C2-C7 carboxylic acids and inertly substituted derivatives thereof.

The objects and advantages of the present invention will be further appreciated in light of the following detailed description and drawings provided herein.

DETAILED DESCRIPTION

Unless clearly defined otherwise from the context, any range of values presented in the following Detailed Description and Claims includes each end point as well as each whole number or fractional part thereof, within the recited range. Additionally, approximating language may be applied to modify any quantitative representation that may vary without resulting in a change in the basic function to which it is related. Accordingly, a value modified by a term or terms, such as "about" and "substantially," may not be limited to the precise value specified.

All references to the Periodic Table of the Elements refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art.

As used herein, the term "(poly)" means optionally more than one, or stated alternatively, one or more. By the term, "aliphatic or cycloaliphatic mono- or polycarboxylic acid" is meant a compound containing at least one carboxylic acid group whose carbon atom is bonded to a carbon atom that is not part of an aromatic ring system. The term "aromatic" refers to a polyatomic ring system containing (4n+2) π-electrons, wherein n is an integer greater than or equal to 1. The term "inert" or "inertly substituted" as used herein refers to groups or substituents that do not further interact with any other components or reagents used in the polymerization process or that do not interact in a manner that is significantly detrimental to the desired polymerization process.

Unless stated to the contrary or conventional in the art, all parts and percents used herein are based on weight. The term "mixture" when used with respect to SCAs, for example, means the use of two or more SCA components and optionally one or more ALA components, simultaneously during at least a portion of a polymerization. The individual SCAs may be added separately to a reactor or premixed and added to the reactor in the form of the desired mixture. In addition, other components of the polymerization mixture, including the procatalyst, may be combined with one or more of the SCAs of the mixture, and/or the procatalyst, cocatalyst and a portion of the monomer optionally may be prepolymerized prior to addition to the reactor. If multiple reactors are employed in a polymerization, it is to be understood that different individual components (e.g., the SCA and ALA) may be employed in either reactor and that the same mixture need not be employed in all reactors of the multiple reactor train. A similar understanding is to govern any other recitation of the term "mixture."

If appearing herein, the term "comprising," or derivatives thereof, is not intended to exclude the presence of any additional component, step, or procedure, whether or not the same is disclosed herein. In order to avoid any doubt, all compositions claimed herein through use of the term "comprising" may include any additional additive, adjuvant, or compound, unless stated to the contrary. The terms "comprising" and "including" (or derivatives thereof) are intended to be synonyms. In contrast, the term, "consisting essentially of" if appearing herein, excludes from the scope of any succeeding recitation any other component, step or procedure, excepting those that are not essential to operability. The term "consisting of," if used, excludes any component, step, or procedure not specifically delineated or listed. The term "or," unless stated otherwise, refers to the listed members individually as well as in any combination.

Embodiments of the present invention are directed to a process for producing an olefin-based polymer with low total ash content and to the low ash polymer. The term "olefin-based polymer" is a polymer containing, in polymerized form, a majority weight percent of an olefin based on the total weight of the polymer. Non-limiting examples of olefin-based polymers include ethylene-based polymers and propylene-based polymers. Further, examples of olefins that can be used in the polymerization are alpha-olefins having 2 to 20 carbon atoms such as ethylene, propylene, 1-butene, 4-methyl-1-pentene, 1-pentene, 1-octene, 1-hexene, 3-methyl-1-pentene, 3-methyl-1-butene, 1-decene, 1-tetradecene, 1-eicosene, and vinylcyclohexane. These alpha-olefins may be used individually or in any combinations as will be apparent to one of ordinary skill in the art given the present disclosure. The term "ash" comprises the residual metal oxides (assuming all of the residual metals are converted to their oxide in the process of firing). For example, ash may include the oxide residue of aluminum, catalyst, cocatalyst, or any additive, such as titanium (Ti) and magnesium (Mg) used in the production of polyolefin polymers. Ash does not include nonmetal residue, such as Cl.

According to exemplary embodiments of the present invention, the catalyst composition for polymerization of an olefin or a mixture comprising an olefin includes a polymerization catalyst, an SCA, and optionally one or more ALA compounds. The SCA and ALA compound may be combined in the form of a mixed external electron donor (MEED). The SCA may comprise at least one silicon-containing compound containing at least one C1-C10 alkoxy group bonded to a silicon atom. The ALA compounds may be C2-C13 mono- or polycarboxylic esters of aliphatic C2-C7 carboxylic acids and inertly substituted derivatives thereof. Similar catalyst compositions are disclosed in U.S. Pat. No. 7,491,670, the content of which is incorporated herein by reference.

Exemplary silicon-containing compounds for use as the SCA include alkoxysilanes. Suitable alkoxysilanes for use in the mixture of SCAs herein are compounds having the general formula: $SiR_m(OR')_{4-m}$ where R independently on each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a C1-C10 alkyl group; and m is 0, 1, 2 or 3. For instance, R may be C6-C12 aryl, alkyl or aralkyl, C3-C12 cycloallyl, C3-C12 branched alkyl, or C3-C12 cyclic amino group, R' may be C1-C4 allyl, and m may be 1 or 2. Examples of alkoxysilane SCAs for use herein include: dicyclopentyldimethoxysilane, ditert-butyldimethoxysilane, methylcyclohexyldimethoxysilane, ethylcyclohexyldimethoxysilane, diphenyldimethoxysilane, diisopropyldimethoxysilane, din-propyldimethoxysilane, diisobutyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxy-silane, and bis(perhydroisoquinolino)dimethoxysilane.

The total molar quantity of the SCA mixture employed based on moles of transition metal of the polymerization catalyst is desirably from 0.1 to 500 or from 0.5 to 100 or from 1 to 50.

The ALA may be compounds of C2-C13 mono- or polycarboxylic esters of aliphatic C2-C7 carboxylic acids and inertly substituted derivatives thereof. For instance, the ALA may include an acetate ester, a propanoate ester, a butyrate ester, a valerate ester, or a hexanoate ester. Suitable esters may include butyl valerate (BV), isobutyl butyrate (iBB), propyl butyrate (PB), pentyl valerate (PV), isopropyl butyrate (iPB), octyl acetate (OA), pentyl acetate (PA), propyl acetate (PrA), pentyl hexanoate (PH), and combinations thereof.

With respect to quantity of the optional ALA, the corresponding molar ratio based on moles of the transition metal of the polymerization catalyst may be from 1 to 10,000 or from 2 to 1000 or from 5 to 100.

Exemplary SCA/ALA mixtures may be those comprising from 1 to 99.9, or from 30 to 99, or from 50 to 98 molar percent of one or more ALA compounds, and correspondingly from 99 to 0.1, or from 70 to 1, or from 50 to 2 molar percent of one or more SCA compounds. For example, the SCA/ALA molar ratio may be about 10 mol %/90 mol % or about 40 mol %/60 mol %.

According to exemplary embodiments of the present invention, the catalyst composition for polymerization of an olefin or a mixture comprising an olefin optionally includes a catalyst lifetime enhancing agent (LEA). Suitable LEAs include the compounds described above as being activity limiting agents. Thus, the same compound may act as an ALA and a LEA. Further, a MEED may include the SCA and a LEA, which may or may not also function as a ALA. LEAs increase the lifetime of the catalyst used during the production of polyolefins. For example, LEAs enable catalysts with a short lifetime to be used in polymerization processes with many reactors in series and thus long residence times. The lifetime of a catalyst may be determined experimentally by determining the exponential decay constant (kd) for the exponential decay function ($e^{-kd \cdot t}$) that can be fitted to the catalyst activity decay with time. From the decay constant, the catalyst lifetime is determined by the following relationship:

$$\text{Lifetime} = \frac{1}{kd} \qquad \text{Eq. (1)}$$

LEAs improve the production of impact copolymers by increasing the lifetime of the catalyst in a second reactor, thus enabling the production of higher rubber content (Fc)

impact copolymers without use of TEAl, which can cause resin stickiness issues. Further, LEAs enable the production of polyolefins at very high catalyst productivity by using long residence times.

In addition to the SCA and ALA compounds described above, internal electron donors may be used in the catalyst composition to help provide tacticity control and catalyst crystallite sizing. Examples of the internal electron donors include substituted phenylene aromatic diesters, halides, or anhydrides or (poly)alkyl ether derivatives thereof. For example, the internal electron donors may be C1-C4 dialkyl esters of phthalic or terephthalic acid, phthaloyl dichloride, phthalic anhydride, and/or C1-C4 (poly)alkyl ether derivatives thereof. In certain embodiments, the internal electron donor is diisobutyl phthalate or di-n-butyl phthalate.

When a polymerization catalyst is present, exemplary catalysts include Ziegler-Natta catalyst systems. Ziegler-Natta procatalysts for use in the present invention comprise a solid complex derived from a transition metal compound, for example, titanium-, zirconium-, chromium- or vanadium-hydrocarbyloxides, hydrocarbyls, halides, or mixtures thereof; and a Group 2 metal compound, such as a magnesium halide. In some embodiments, the precursors comprise a mixture of titanium halides supported on magnesium halide compounds.

Any of the conventional Ziegler-Natta, transition metal compound containing procatalysts can be used in the present invention. The procatalyst component of a conventional Ziegler-Natta catalyst may contain a transition metal compound of the general formula $TrX_x$ where Tr is the transition metal, X is a halogen or a C1 to C10 hydrocarboxyl or hydrocarbyl group, and x is the number of such X groups in the compound, in combination with the foregoing Group 2 metal compound. For example, Tr may be a Group 4, 5 or 6 metal. In certain embodiments, Tr may be a Group 4 metal, such as titanium. X may be, for example, chloride, bromide, C1 to C4 alkoxide or phenoxide, or a mixture thereof. For example, X may be chloride.

Illustrative examples of suitable transition metal compounds that may be used to form a Ziegler-Natta procatalyst are $TiCl_4$, $ZrCl_4$, $TiBr_4$, $TiCl_3$, $Ti(OC_2H_5)_3Cl$, $Zr(OC_2H_5)_3Cl$, $Ti(OC_2H_5)_3Br$, $Ti(OC_3H_7)_2Cl_2$, $Ti(OC_6H_5)_2Cl_2$, $Zr(OC_2H_5)_2Cl_2$, and $Ti(OC_2H_5)Cl_3$. Mixtures of such transition metal compounds may be used as well. No restriction on the number of transition metal compounds is made as long as at least one transition metal compound is present. In certain embodiments, the transition metal compound is a titanium compound.

Examples of suitable Group 2 metal compounds include magnesium halides, such as magnesium chloride for example, dialkoxymagnesiums, alkoxymagnesium halides, magnesium oxyhalides, dialkylmagnesiums, magnesium oxide, magnesium hydroxide, carboxylates of magnesium, magnesium chloride adducts, and carboxylated magnesium dialkoxides or aryloxides. For example, the Group 2 metal compound may be magnesium dichloride or magnesium di(C1-C4)alkoxides, such as diethoxymagnesium.

Additionally, the procatalysts may comprise titanium moieties. Suitable sources of titanium moieties include titanium alkoxides, titanium aryloxides, and/or titanium halides. In certain embodiments, compounds used to prepare the procatalysts may comprise one or more magnesium-di(C1-C4)alkoxides, magnesium dihalides, magnesiumalkoxyhandes, or mixtures thereof and one or more titanium tetra($C_{1-4}$) alkoxides, titanium tetrahalides, titanium($C_{1-4}$) alkoxyhalides, or mixtures thereof.

Exemplary Ziegler-Natta procatalysts that may be used in the present invention are disclosed in U.S. Pat. Nos. 4,927,797; 4,816,433; 4,839,321; 8,288,585; and 8,536,372, the contents of which are incorporated herein by reference. A procatalyst is described therein comprising a solid catalyst component obtained by (i) suspending a dialkoxy magnesium in an aromatic hydrocarbon that is liquid at normal temperatures, (ii) contacting the dialkoxy magnesium with a titanium halide, and further (iii) contacting the resulting composition a second time with the titanium halide, and contacting the dialkoxy magnesium with a diester of an aromatic dicarboxylic acid at some point during the treatment with the titanium halide in (ii).

Various methods of making precursor compounds used to prepare the present procatalysts are known in the art. These methods are described, for example, in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, the contents of all of which are incorporated herein by reference; and elsewhere. In certain embodiments, the preparation involves chlorination of the foregoing mixed magnesium compounds, titanium compounds, or mixtures thereof, and may involve the use of one or more compounds, referred to as "clipping agents," that aid in forming or solubilizing specific compositions via a solid/solid metathesis. Examples of suitable clipping agents include trialkylborates, for example triethylborate, phenolic compounds, for example cresol, and silanes.

An exemplary precursor for use herein is a mixed magnesium/titanium compound of the formula $Mg_dTi(OR^e)_eX_f$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 5, or 2-4, or 3; e is 2-12, or 6-10, or 8; and f is 1-10, or 1-3, or 2. The precursors, having a desirable morphology and surface area, may be prepared by controlled precipitation through removal of an alcohol from the reaction mixture used in their preparation. An exemplary reaction medium comprises a mixture of an aromatic liquid, for example a chlorinated aromatic compound, such as chlorobenzene, with an alkanol, such as ethanol, and an inorganic chlorinating agent. Suitable inorganic chlorinating agents include chlorine derivatives of silicon, aluminum, and titanium, such as titanium tetrachloride or titanium trichloride. The resulting precursors may have a uniform particle size and may be resistant to particle crumbling and degradation of the resulting procatalyst.

The precursor may next be converted to a solid procatalyst by further reaction (halogenation) with an inorganic halide compound, such as a titanium halide compound, and incorporation of an internal electron donor. If not already incorporated into the precursor in sufficient quantity, the electron donor may be added separately before, during, or after halogenation. This procedure may be repeated one or more times, optionally in the presence of additional additives or adjuvants, and the final solid product may be washed with an aliphatic solvent.

A suitable method for halogenation of the precursor may be by reacting the precursor at an elevated temperature with a tetravalent titanium halide, optionally in the presence of a hydrocarbon or halohydrocarbon diluent. An exemplary tetravalent titanium halide is titanium tetrachloride. The optional hydrocarbon or halohydrocarbon solvent employed in the production of the olefin polymerization procatalyst may contain up to 12 carbon atoms inclusive, such as up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. In certain embodiments, the aliphatic halohydrocarbon may be compounds containing at least two chloride substituents, such as carbon tetrachloride and 1,1,2-trichloroethane. In certain embodiments, the aromatic halohydrocarbon may be chlorobenzene and/or o-chlorotoluene.

The halogenation may be repeated one or more times, optionally accompanied by washing with an inert liquid such as an aliphatic or aromatic hydrocarbon or halohydrocarbon between halogenations and following the final halogenation. Further, optionally one or more extractions involving contacting with an inert liquid diluent, such as an aliphatic or aromatic hydrocarbon, optionally at an elevated temperature greater than 100° C., such as greater than 110° C., may be employed to remove labile species, such as $TiCl_4$.

The foregoing are exemplary methods of making the solid procatalyst, and any method of making, recovering and storing the solid procatalyst may be suitable for use in the present invention.

The Ziegler-Natta transition metal catalyst may also include an inert support material, if desired. The support may be an inert solid which does not adversely alter the catalytic performance of the transition metal compound. Examples may include metal oxides, such as alumina, and metalloid oxides, such as silica.

Cocatalysts for use with the foregoing Ziegler-Natta catalysts according to certain embodiments of the invention may include aluminum-containing compounds, such as organoaluminum compounds for example. Exemplary organoaluminum compounds include trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10 carbon atoms, or from 1-6 carbon atoms, in each alkyl- or alkoxide-group. Exemplary cocatalysts include C1-C4 trialkylaluminum compounds, such as triethylaluminum (TEAl).

In an embodiment of the present invention including both an aluminum-containing compound and a transition metal (Tr), a polymer with a low ash content may be produced without significant loss of catalyst productivity with a decreased Al/Tr ratio. The Al/Tr ratio may be less than 50, between 10 and 50, between 20 and 30, about 25, or about 25 or less. In one embodiment, the transition metal is titanium, and the Al/Ti ratio is about 25. Various embodiments of the present invention include a decreased Al/Tr ratio in a process including an ALA/LEA compound and a decreased Al/Tr ratio in a process without an ALA/LEA compound.

Further, the Al/mixed external donor molar feed ratio may be greater than 5, while the silane/mixed external donor molar feed ratio may be less than 0.2.

Further, a polymer made according to an embodiment of the present invention may include a low residue and low ash content. Such a polymer may be called a wash-free polymer. The ash content of a polymer made using the relatively low Al/Tr ratio may be less than 15 ppm, less than 10 ppm, less than 5 ppm, or between 1 and 5 ppm. The transition metal residue, such as titanium residue, may be less than 0.3 ppm, about 0.1 ppm or less, or between 0.03 ppm and 0.3 ppm. The aluminum residue may be less than 2 ppm, or less than 1.5 ppm. The catalyst productivity may be between 200 and 1,000 ton/kg, 200 and 500 ton/kg, 300 and 500 ton/kg, 400 and 500 ton/kg, 500 and 1,000 ton/kg, or 700 and 1,000 ton/kg.

In another aspect of the invention, a wash-free polypropylene may be used as starting material to form a sheet or film, such as a capacitor film. In such an embodiment, additives such as antioxidants, ultraviolet absorbers, metal soaps, stabilizers such as hydrochloric acid absorber, lubricants, plasticizers, flame retardants, and antistatic agents may be added. A suitable method of preparing a capacitor film is described in U.S. Pat. No. 7,691,958, which is herein incorporated by reference.

A further aspect of the invention is directed to a polymerization process. The process includes contacting an olefin or a mixture of the olefin and one or more copolymerizable comonomers under suitable polymerization conditions in the presence of the catalyst system described above. In one embodiment, a mixture of olefins is copolymerized. In another embodiment, one olefin (e.g., propylene or 1-butene) is homopolymerized. In the homopolymerization of these olefins, a polyunsaturated compound such as conjugated diene or non-conjugated diene may be used as a comonomer. Non-limiting examples of copolymerizable comonomers include styrene, butadiene, acrylonitrile, acrylamide, alpha-methyl styrene, chlorostyrene, vinyl toluene, divinyl benzene, diallyphthalate, alkyl methacrylates and alkyl acrylates. In one embodiment, the comonomers include thermoplastic and elastomeric monomers.

The polymerization of an olefin is typically carried out in the gaseous or liquid phase. In one embodiment, the polymerization employs a catalyst system containing the solid catalyst component in an amount from about 0.001 to about 0.75 millimoles calculated as Ti atom per liter of the volume of the polymerization zone, the organoaluminum compound in an amount from about 1 to about 2,000 moles per mole of Ti atoms in the solid catalyst component, and the organosilicon compound in an amount from about 0.001 to about 10 moles calculated as Si atoms in the organosilicon compound per mole of the metal atoms in the organoaluminum compound.

The use of hydrogen at the time of polymerization promotes and contributes to control of the molecular weight of the resulting polymer, and the polymer obtained may have a desirable melt flow rate. The catalyst productivity of the catalyst system and low residue and ash content of the resulting polymer are improved when the methods and systems of the presently disclosed invention are utilized.

In one embodiment, the polymerization temperature in the polymerization is from about 20° C. to about 200° C. In another embodiment, the polymerization temperature in the polymerization reactor is from about 50° C. to about 180° C. The catalyst productivity and the isotacticity of the polymer produced are both dependent on the polymerization temperature in the reactor. To further reduce ash content, it can be beneficial to maximize catalyst productivity while maintaining high isotacticity. The polymerization temperature used in the present invention can be such that the productivity and isotacticity is near a maximum, which is typically between 70° C. and 85° C.

In one embodiment, the polymerization pressure in the polymerization is typically from atmospheric pressure to about 100 kg/cm². In another embodiment, the polymerization pressure in the polymerization is typically from about 2 kg/cm² to about 50 kg/cm².

The polymerization process may occur within a fluidized-bed reactor containing a fluidized bed comprising the catalyst system described above. The polymerization may be carried out batchwise, semi-continuously, or continuously. The polymerization may also be carried out in two or more stages under different reaction conditions.

The olefin polymer so obtained may be a homopolymer, a random copolymer, a block copolymer or an impact copolymer. The impact copolymer contains an intimate mixture of a polyolefin homopolymer and a polyolefin rubber. Examples of polyolefin rubbers include ethylene propylene rubber (EPR) and ethylene propylene diene monomer rubber (EPDM). The olefin polymer obtained by using the catalyst system has a very small amount of an amorphous polymer component and therefore a small amount of a hydrocarbon-soluble component. Accordingly, a film molded from the resultant polymer has low surface tackiness.

Examples

General Procedure for the Synthesis of Polypropylene: To perform the tests for Comparative Example 1 (CE1) and Inventive Examples 1 and 2 (IE1 and IE2), propylene, a Ziegler-Natta catalyst composition of a titanium compound and an organoaluminum co-catalyst, a mixed external electron donor (MEED) comprising a mixture of a silane SCA and an alkyl ester ALA (comparative examples) or an ALA/LEA (inventive examples) were introduced into a pilot plant scale fluidized bed reactor in accordance with Table 1 and allowed to react to produce polypropylene homopolymer samples with a nominal melt flow of 1 to 10 g/10 min. The catalyst used in the polymerization for CE1 and IE1 was a supported Ziegler-Natta solid catalyst comprising Mg and Ti. For the silane SCA component in the MEED, n-propyltrimethoxysilane (NPTMS) was used. For the alkyl ester ALA component, isopropyl myristate (IPM) was used in CE1. Pentyl valerate (PV) was used as the ALA/LEA in IE1 and IE2. Compositions of the MEED used in each example are listed in Table 1.

The catalyst was prepared with 3-methyl-5-tert butyl-1,2 phenylene dibenzoate as the internal electron donor. The catalyst and the method of preparation is described in U.S. Pat. No. 8,536,372, which is herein incorporated by reference. The solid catalyst was fed as a slurry in white mineral oil, which is sold under the tradename HYDROBRITE 380, and injected by means of a syringe pump and a propylene carrier flow of 4 pounds per hour into the side of a 14" diameter fluidized bed reactor. A carrier flow of 4 pounds per hour of propylene was used to feed and disperse the catalyst slurry into the reactor. As co-catalyst, TEAl was fed to the reactor as a 2.5 wt % solution in isopentane in all examples. The MEED was fed as a 1 wt % solution in isopentane.

For CE1, IE1, and IE2, the reactor was first run in continuous mode at a more or less steady state production rate as listed in Table 1. At this stage Ti residuals were measured by X-ray fluorescence to determine catalyst productivity and catalyst residuals of the initial sample. The fluidized bed reactor was run with high fluidized bulk density (e.g., from 8 to 18 lb/ft³) by using a fluidization superficial gas velocity of, e.g., 0.8 to 1.1 ft/s (0.24 to 0.33 m/s). Then, at a pre-determined time, bed accumulation tests were performed to produce the samples. To perform the test, the reactor was first allowed to reach steady state production conditions with polymer fluidized bed weight W0. Then, at a predetermined time, the catalyst, co-catalyst, and MEED feeds to the reactor are stopped. At the same time, removal of product from the reactor is stopped so that subsequent production is held in the reactor and accumulates so that the weight of polymer material in the reactor increases. The reactor was held in this state for a time, tBAT, of greater than 2 hours and the weight of material produced during each hour following the start of the test was measured by determining the increase in fluidized bed weight during that time using the pressure difference between pressure taps below and above the fluidized bed. The weight produced during the test (WBAT) after time tBAT is determined by weighing out the total product removed from the reactor to bring the bed weight back to the initial value W0.

To measure the residual Ti by X-Ray Fluorescence, molded polypropylene samples are irradiated by a chromium target x-ray tube. Excitations of the inner shell electrons of Ti produce a secondary emission with a wavelength characteristic of Ti and an intensity proportional to its concentration. The emission intensity is measured at a specific angle of diffraction from a dispersion crystal placed in the secondary beam. Measurements were conducted using a PANalytical (Philips) X-ray spectrometer. Catalyst productivity was determined from the Ti residuals as indicated, and the Ti loading of the catalyst. The production rate was defined as the weight of product discharge by the reactor during a 3-hour period divided by 3.

Ash Content: Ash Content in reactor product powder is calculated assuming metals are oxidized as according to the following stoichiometry: Ti converts to $TiO_2$, Al converts to $Al_2O_3$, Mg converts to MgO and Si converts to $SiO_2$. Therefore, ash is calculated using the formula based on the Ti, Al, Mg, and Si residues expressed as ppmw:

$$\text{Total Ash}=1.668\times\text{Ti}+1.658\times\text{Mg}+1.889\times\text{Al}+2.139\times\text{Si} \qquad \text{Eq. (2)}$$

For the initial sample taken when the reactor is at steady state before the bed accumulation test, Ti residuals and Mg residuals were calculated from the Ti residuals and the ratio of the Mg to Ti loading on the catalyst in wt %. Al residuals were calculated from the feed rate of Al in the form of TEAl divided by the polymer production rate. Si residuals were calculated from the feed rate of Si as silane divided by the polymer production rate. Cl residuals were calculated from the Ti residuals and the ratio of the Cl to Ti loading on the catalyst in wt %. The elemental loading on the solid catalyst used in all the examples was as follows: Ti loading=4.2 wt %; Mg loading=15.3 wt %; and Cl loading=50 wt %.

Bed accumulation test samples were taken at the end of the bed accumulation test after a time in Table 2 tBAt. For the bed accumulation test sample, Ti, Mg, Al, and Cl residuals in Table 2 were calculated from the Ti, Mg, Al, and Cl residuals, respectively, in the initial steady state sample divided by the relative increase in bed weight during the bed accumulation test. For example, if the bed weight doubled during the bed accumulation test, then the Ti residuals of the test material would be the Ti residuals before the test divided by 2. This material balance method of determining Ti residuals was preferred to the X-ray fluorescence method because the residuals in the present invention are below the detection limit (i.e., 0.4 ppm) of the instrument.

Table 1 shows the reactor conditions and product properties for the steady state production of CE1, IE1, and IE2.

TABLE 1

|  |  | CE1 | IE1 | IE2 |
|---|---|---|---|---|
| Reactor Conditions |  |  |  |  |
| Catalyst Feed Rate | [cc/hr] | 0.8 | 0.7 | 0.9 |
| Catalyst Slurry Solids | [wt %] | 27.0 | 27.0 | 27.0 |
| Catalyst Ti Loading | [wt %] | 4.2 | 4.2 | 4.2 |
| Reactor Temperature | [° C.] | 80 | 80 | 80 |
| Total Pressure | [psi] | 422 | 422 | 422 |
| C3 Partial Pressure | [psi] | 321 | 320 | 320 |
| Bed Weight | [kg] | 22.8 | 23.5 | 22.7 |
| Residence Time | [hr] | 2.1 | 2.0 | 2.1 |
| Superficial Gas Velocity | [m/s] | 0.31 | 0.31 | 0.31 |
| H2/C3 | [mol/mol] | 0.009 | 0.005 | 0.005 |
| Alkyl Type |  | TEAl | TEAl | TEAl |
| MEED Type | [ALA/SCA] | IPM/NPTMS | PV/NPTMS | PV/NPTMS |
| ALA/SCA composition | [mol/mol] | 98/2 | 90/10 | 90/10 |
| TEAl Concentration | [wt %] | 2.5 | 2.5 | 0.5 |
| TEAl Feed Rate | [cc/hr] | 45 | 31 | 99 |
| TEAl/Ti Feed Ratio | [mol/mol] | 50 | 25 | 13 |
| TEAl/MEED Feed Ratio | [mol/mol] | 3.4 | 9.5 | 4.8 |
| MEED Concentration | [wt %] | 1.0 | 1.0 | 1.1 |
| MEED Feed Rate | [cc/hr] | 73 | 12 | 16 |
| Production Rate | [kg/hr] | 11 | 12 | 11 |
| Product Properties |  |  |  |  |
| Ti Residuals | [ppm] | 0.56 | 0.59 | 0.61 |
| Catalyst Productivity by Ti Residuals | [kg/kg] | 75,000 | 71,186 | 68,852 |
| Melt Flow | [g/10 min] | 2.6 | 1.3 | 1.2 |
| Xylene Solubles | [wt %] | 2.6 | 3.7 | 2.7 |

Table 2 shows the metal residuals and ash content determined by mass balance from the amount of material produced during the bed accumulation test, WBAT. Ash was calculated using Equation 2.

TABLE 2

|  |  | CE1 | IE1 | IE2 |
|---|---|---|---|---|
| tBAT | [hr] | 15.0 | 11.0 | 13.0 |
| WBAT | [kg] | 22.7 | 97.3 | 51.8 |
| Catalyst Productivity | [kg/kg] | 143,231 | 406,403 | 221,552 |
| Ti | [ppm] | 0.29 | 0.10 | 0.19 |
| Mg | [ppm] | 1.07 | 0.38 | 0.69 |
| Al | [ppm] | 8.27 | 1.46 | 1.34 |
| Si | [ppm] | 0.05 | 0.02 | 0.01 |
| Cl | [ppm] | 3.49 | 1.23 | 2.26 |
| Ash | [ppm] | 18.0 | 3.6 | 4.0 |

The external donors containing isopropyl myristate as ALA are commercially available and were examined as the comparative example. The inventive examples, in which the Al/Ti ratio was half and a quarter of that of the comparative example, and the external donor contained pentyl valerate as ALA, exhibited excellent catalyst productivity and long catalyst lifetime. Further, the inventive examples provided much lower residue and ash levels than the comparative example, as can be seen in Table 2. It is very surprising that the catalyst productivity was high enough and catalyst lifetime was long enough that such large amounts of material were produced in the inventive examples, especially at the low Al/Ti ratio of the embodiments of the present invention. The lower ash content was the result of a combination of factors including: longer catalyst lifetime at the lower Al/Ti ratio, lower amount of Al fed to the reactor at the lower Al/Ti ratio, longer catalyst lifetime, and low xylene solubles at a reactor temperature of 70 to 85° C. The residual amounts of Mg, Al, Si, Cl, and ash were reduced significantly such that the ash for the inventive examples is below 15 ppm.

To perform the tests for Comparative Example 2 (CE2) and Inventive Example 3 (IE3), a Ziegler-Natta catalyst composition of a titanium compound, an organoaluminum co-catalyst, and an external electron donor comprising a silane SCA were introduced into a 2-liter lab scale bulk-phase autoclave reactor in accordance with Table 3 and allowed to react to produce polypropylene homopolymer samples with a nominal melt flow of 1 to 10 g/10 min. The catalyst used in the polymerization for CE2 and IE3 was a supported Ziegler-Natta solid catalyst comprising Mg and Ti and was prepared with 3-methyl-5-tert butyl-1,2 phenylene dibenzoate as the internal electron donor. For the silane SCA, methylcyclohexyldimethoxysilane (MCHDMS) was used and no alkyl ester ALA/LEA component was used in CE2 or IE3. In each example, 5 mg of catalyst was introduced into the reactor and reacted for approximately 2 hours in the presence of propylene monomer and hydrogen. At the end of each test, the final yield of polymer produced was weighed and catalyst productivity was calculated by dividing the yield of polymer by the amount of catalyst fed. Polymer properties such as melt flow and xylene solubles were measured and ash content was calculated from the initial amount of catalyst, alkyl, and SCA and are reported in Table 3.

TABLE 3

| Polymerization (2 hour residence time) | | | |
|---|---|---|---|
|  |  | CE2 | IE3 |
| Reactor Conditions |  |  |  |
| Catalyst Feed | [mg] | 0.8 | 0.7 |
| Catalyst Ti Loading | [wt %] | 4.2 | 4.2 |
| Reactor Temperature | [° C.] | 70 | 70 |
| Total Pressure | [Mpa] | 3.17 | 3.17 |
| Residence Time | [hr] | 2.0 | 2.0 |
| H2 Dose | [mmol] | 0.009 | 0.005 |

TABLE 3-continued

Polymerization (2 hour residence time)

|  |  | CE2 | IE3 |
|---|---|---|---|
| Alkyl Type |  | TEAl | TEAl |
| SCA Type |  | MCHDMS | MCHDMS |
| TEAl/Ti Feed Ratio | [mol/mol] | 100 | 25 |
| TEAl/SCA Feed Ratio | [mol/mol] | 10.0 | 2.5 |
| Yield | [g] | 562 | 392 |
| Catalyst Productivity | [kg/kg] | 112,360 | 78,460 |
| Product Properties |  |  |  |
| Melt Flow | [g/10 min] | 6.3 | 7.2 |
| Xylene Solubles | [wt %] | 2.7 | 2.9 |

As can be seen, for IE3, the Al/Ti ratio is only 25 and unexpectedly the catalyst productivity is fairly high, at 78,460 kg/kg. The catalyst activity decay with time was fitted to the exponential decay function ($e^{-k_d \cdot t}$) by comparing ratio of the production during the second hour (P2) to the production during the first hour (P1) to the theoretical dependence of P2/P1 on lifetime for a batch reactor. The catalyst lifetime was determined in this way and report below in Table 4.

TABLE 4

Polymerization (6 hour residence time)

|  |  | CE2 | IE3 |
|---|---|---|---|
| P(2)/P(1) |  | 0.598 | 0.710 |
| Catalyst Lifetime | [hr] | 1.94 | 2.92 |
| Catalyst Productivity | [kg/kg] | 159,660 | 134,047 |
| Ti | [ppm] | 0.26 | 0.31 |
| Mg | [ppm] | 0.96 | 1.14 |
| Al | [ppm] | 14.83 | 4.42 |
| Si | [ppm] | 1.54 | 1.84 |
| Cl | [ppm] | 3.13 | 3.73 |
| Ash | [ppm] | 33.3 | 14.7 |

As can be seen, longer catalyst lifetime results from the lower Al/Ti ratio. The resulting catalyst lifetime was then used to determine the total catalyst productivity when the reactor has a residence time of 6 hours or the reactor setup is two or more reactors in series but with a total residence time of 6 hours.

The results for catalyst productivity and corresponding elemental residuals and ash are also reported in Table 4. As can been seen, at 6 hour residence time, the catalyst productivity is about the same for CE2 and IE3 even though Al/Ti is much lower for IE3. This result is because of the unexpected longer catalyst lifetime at the lower Al/Ti ratio. The combination of this effect and the intrinsically lower Al residual with lower Al/Ti ratio causes the ash content to be less than 15 ppm in IE3 while the polymer in CE2 has an ash content of greater than 30 ppm.

This has been a description of embodiments of the present invention along with the various methods of practicing the present invention. However, the invention itself should only be defined by the appended claims.

What is claimed is:

1. A polymerization process comprising:
    contacting an olefin or a mixture of the olefin and one or more copolymerizable comonomers under polymerization conditions with a catalyst composition comprising:
    one or more polymerization catalysts; and
    a selectivity control agent comprising at least one silicon-containing compound containing at least one C1-C10 alkoxy group bonded to a silicon atom; and
    forming a polymer with a total ash content of less than 5 ppm.

2. The process of claim 1, wherein the catalyst composition comprises an aluminum-containing compound and a transition metal compound, wherein an aluminum to transition metal weight ratio is about 50 or less.

3. The process of claim 2, wherein the aluminum to transition metal weight ratio is about 25 or less.

4. The process of claim 1, wherein a catalyst productivity is between 200 and 500 ton/kg.

5. The process of claim 1, wherein the polymer has at least one of the following: a titanium content of 30 to 300 ppb, a silicon content of 1 to 50 ppb, an aluminum content of 0.2 to 6 ppm, or a magnesium content of 0.1 to 1 ppm.

6. The process of claim 1, wherein the olefin is propylene.

7. The process of claim 1, wherein the polymer exhibits a melt flow from 0.5 g/10 min to 400 g/10 min, as measured in accordance with ASTM D-1238-01 at 230° C. with a 2.16 kg weight.

8. The process of claim 7, wherein the melt flow is from 0.5 g/10 min to 6 g/10 min.

9. The process of claim 1, wherein contacting the olefin or the mixture of the olefin and one or more copolymerizable comonomers under polymerization conditions occurs in a first polymerization reactor to form an active olefin-based polymer, and the process further comprises:
    contacting, under polymerization conditions, the active olefin-based polymer with at least one olefin in a second polymerization reactor to form the polymer with a total ash content of less than 5 ppm.

10. The process of claim 1, wherein the polymer is a wash-free propylene-based polymer.

11. The process of claim 1, wherein the catalyst composition further comprises an amount of one or more agent compounds of C2-C13 mono- or polycarboxylic esters of aliphatic C2-C7 monocarboxylic acids and inertly substituted derivatives thereof.

12. A composition comprising a polyolefin and a total ash content of less than 5 ppm, and at least one of the following: a titanium content of 30 to 300 ppb, a silicon content of 1 to 50 ppb, an aluminum content of 0.2 to 6 ppm, or a magnesium content of 0.1 to 1 ppm.

13. An article comprising the composition of claim 12.

14. A capacitor film comprising the composition of claim 12.

15. A polypropylene homopolymer with a total ash content of less than 5 ppm and at least one of the following: a titanium content of 30 to 300 ppb, a silicon content of 1 to 50 ppb, an aluminum content of 0.2 to 6 ppm, or a magnesium content of 0.1 to 1 ppm.

16. A polymerization process comprising:
    contacting an olefin or a mixture of the olefin and one or more copolymerizable comonomers under polymerization conditions with a catalyst composition comprising:
    one or more polymerization catalysts having a catalyst productivity is between 200 and 500 ton/kg; and
    a selectivity control agent comprising at least one silicon-containing compound containing at least one C1-C10 alkoxy group bonded to a silicon atom; and
    forming a polymer with a total ash content of less than 15 ppm.

* * * * *